United States Patent [19]

Nofre et al.

[11] Patent Number: 5,196,540
[45] Date of Patent: Mar. 23, 1993

[54] SWEETENING AGENT DERIVED FROM L-ASPARTIC OR L-GLUTAMIC ACID

[76] Inventors: Claude Nofre, 119, Cours Albert Thomas, 69003 Lyon; Jean-Marie Tinti, 5, Avenue de Grenoble, 69330 Meyzieu, both of France

[21] Appl. No.: 601,623

[22] Filed: Oct. 23, 1990

[30] Foreign Application Priority Data

Oct. 24, 1989 [FR] France .................. 89 14236

[51] Int. Cl.$^5$ .......................................... C07D 213/75
[52] U.S. Cl. .......................................... 546/309
[58] Field of Search ................................ 546/309

[56] References Cited

U.S. PATENT DOCUMENTS

| | | | |
|---|---|---|---|
| 3,725,453 | 4/1973 | Lapidus et al. | 260/465 D |
| 3,775,460 | 11/1973 | Lapidus et al. | 260/465 D |
| 4,645,678 | 2/1987 | Nofre et al. | 426/548 |
| 4,935,517 | 6/1990 | Nofre et al. | 544/322 |
| 4,997,667 | 3/1991 | Nofre et al. | 426/548 |

FOREIGN PATENT DOCUMENTS

| | | |
|---|---|---|
| 0107597 | 5/1984 | European Pat. Off. |
| 0195731 | 9/1986 | European Pat. Off. |
| 321368 | 6/1989 | European Pat. Off. |
| 0338946 | 10/1989 | European Pat. Off. |

OTHER PUBLICATIONS

Patent Abstracts of Japan vol. 11, No. 361 (C-459) (2808) Nov. 25, 1987, abstract of JP-A-62 132847 (Ajinomoto) Jun. 16, 1987.
Patent Abstracts of Japan vol. 12, No. 132 (C-490) (2979) Apr. 22, 1988, abstract of JP-A-52 252754 (Ajinomoto) Nov. 4, 1987.

*Primary Examiner*—Mukund J. Shah
*Assistant Examiner*—Matthew V. Grumbling
*Attorney, Agent, or Firm*—Armstrong, Westerman, Hattori, McLeland & Naughton

[57] ABSTRACT

The present invention relates to a novel sweetening agent and to its method of preparation. This novel sweetening agent is a 2-substituted acyl derivative of L-aspartic or L-glutamic acid and has the general formula

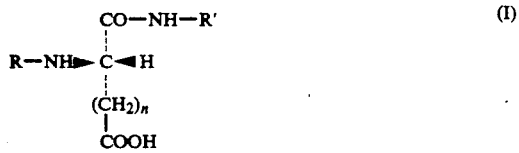

R being an acyl group of the formula

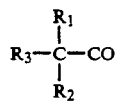

and R' being a group of the formula

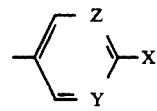

$R_1$, $R_2$, $R_3$, X, Y and Z being variously defined. This novel sweetening agent is essentially characterized by a high sweetening potency and a high stability compatible with the conditions of industrial use, and is applied especially for sweetening soft drinks.

9 Claims, 1 Drawing Sheet

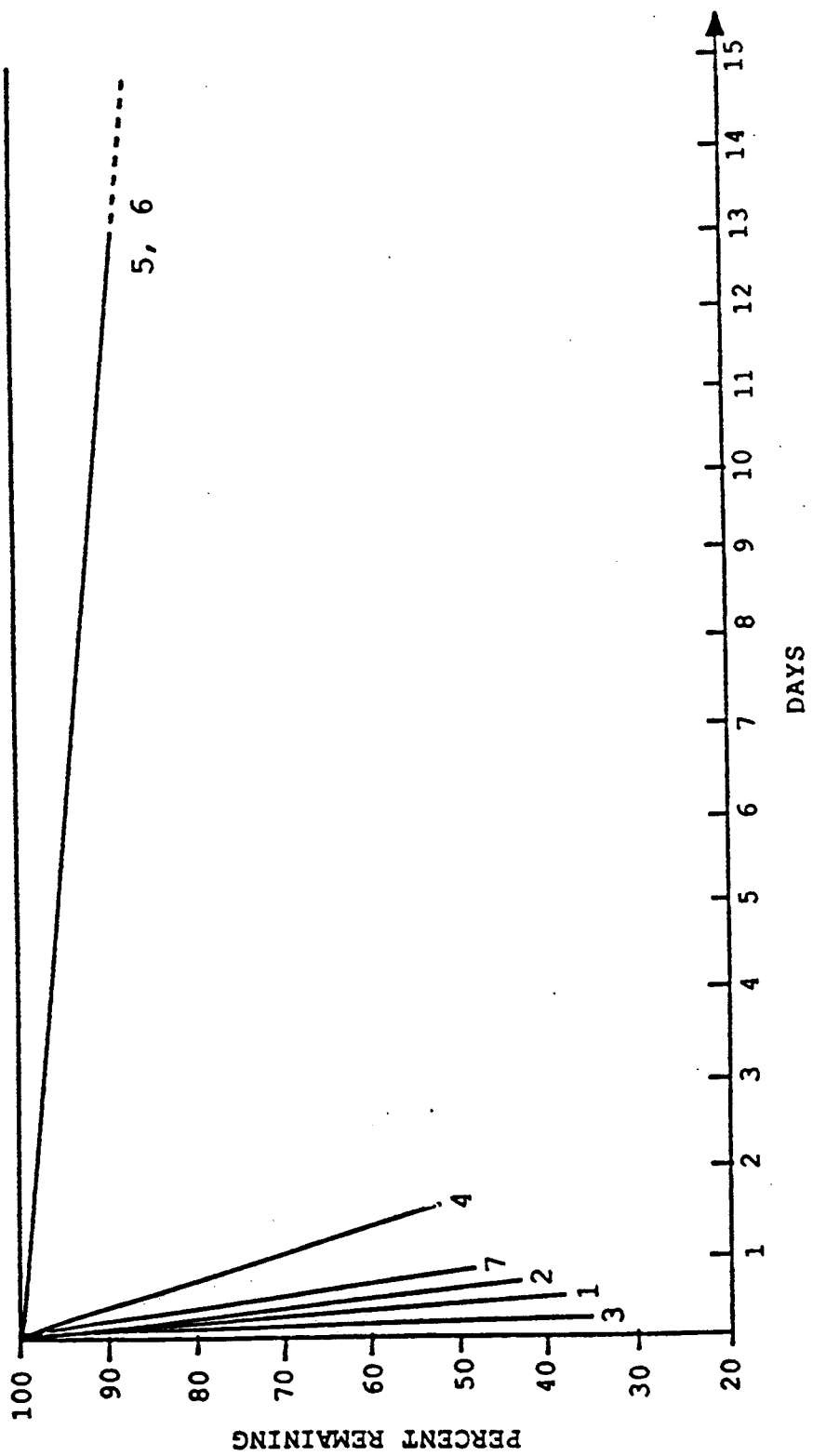
FIGURE 1 : COMPARATIVE STABILITY (pH 3, 70 °C)

SWEETENING AGENT DERIVED FROM L-ASPARTIC OR L-GLUTAMIC ACID

The present invention relates to a novel sweetening agent derived from L-aspartic or L-glutamic acid and to its method of preparation.

This novel sweetening agent is particularly useful for sweetening a variety of products and in particular drinks, especially soft drinks, foods, confectionery, pastries, chewing gums, hygiene products and toiletries, as well as cosmetic, pharmaceutical and veterinary products.

It is known that, to be usable on the industrial scale, a sweetening agent must possess firstly an intense sweetening potency, making it possible to limit the cost of use, and secondly a satisfactory stability, i.e. a stability compatible with the conditions of use.

In the particular case of soft drinks, which represent the main use of sweetening agents, it is very difficult to obtain a satisfactory stability, all the more so because some of these drinks have the characteristic of being acid with a pH generally of between 2.5 and 3.5.

The documents U.S. Pat. Nos. 3,725,453 and 3,775,460 have described sweetening agents derived from L-aspartic acid, of the following general formula:

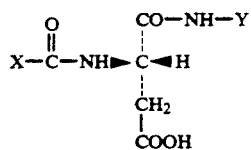
(A)

in which X is $CF_3$ or $CCl_3$ and in which Y is 4-CN—$C_6H_4$, 4-Cl—$C_6H_4$, 4-Br—$C_6H_4$, 4-F—$C_6H_4$ or $C_6H_5$. The sweetening potency of some of these compounds has been evaluated (J. Med. Chem., 1973, 16(2), p. 162-166). For example, the compound of formula (1) (X=$CF_3$ and Y=4-CN—$C_6H_4$) has a sweetening potency equal to 3000 times that of sucrose (by comparison with a 2% solution of sucrose):

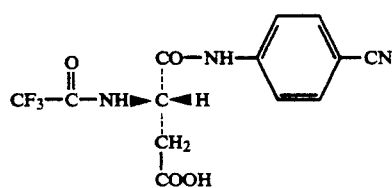
(1)

The compounds of general formula (A) in which X=$CF_3$ and Y=4-Cl—$C_6H_4$, 4-Br—$C_6H_4$ or $C_6H_5$ have a weaker sweetening potency than the compound of formula (1), which is between 12 and 120 times that of sucrose.

Furthermore, it has been shown that the L-aspartyl residue in the above compounds can be replaced with its higher homolog, the L-glutamyl residue, without appreciable modification of the sweetening potencies (Naturwissenschaften, 1981, 68, 143).

The document JP-A-87-132847 discloses in general terms sweetening agents of the general formula

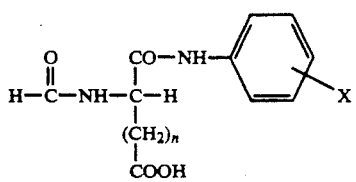
(B)

in which X is CN or $NO_2$ and n is equal to 1 or 2. The most active compound specifically described, of the formula

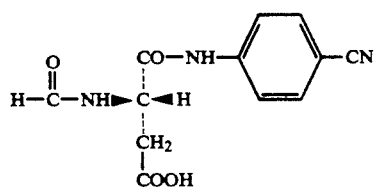
(2)

possesses a weak sweetening potency evaluated at 40 times that of sucrose.

The document JP-A-87-132863 discloses in general terms sweetening agents of the general formula

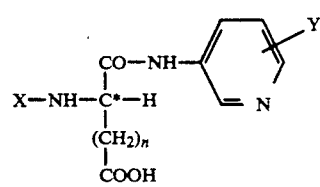
(C)

in which X is $CF_3CO$ or $CCl_3CO$, Y is H, halogen, CN or $NO_2$ and n is equal to 1 or 2, the asterisk indicating that the amino acid residue can have an L or DL configuration. Only two compounds are specifically described, which are derived from L-aspartic acid (n=1) and in which Y=H and X=$CF_3CO$ and $CCl_3CO$, and their sweetening potencies are respectively 40 times and 1 times that of sucrose.

The document JP-A-87-252754 discloses in general terms sweetening agents of the general formula

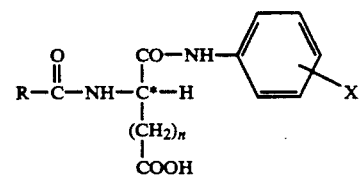
(D)

in which X is CN or $NO_2$, R is H or a $C_1$-$C_{10}$ alkyl, aromatic, alkoxy or aryloxy group and n is equal to 1 or 2, and in which the asterisk indicates that the amino acid residue has an L or DL configuration.

Of the 15 Examples specifically described (Table 1), 14 compounds are derivatives of aspartic acid and only one is a derivative of glutamic acid. The sweetening potency (SP) of these compounds (by comparison with a 5% solution of sucrose) is between 1 and 720 times that of sucrose.

TABLE 1

| R | * | n | X | SP |
|---|---|---|---|---|
| H | L | 1 | CN | 40 |
| H | L | 1 | NO$_2$ | 1 |
| H | D | 1 | CN | 110 |
| H | D | 1 | NO$_2$ | 50 |
| CH$_3$ | D | 1 | CN | 10 |
| C$_6$H$_5$ | L | 1 | CN | 720 |
| C$_6$H$_5$ | L | 1 | NO$_2$ | 420 |
| CH$_3$O | L | 1 | CN | 70 |
| CH$_3$O | D | 1 | CN | 140 |
| C$_2$H$_5$O | L | 1 | CN | 80 |
| C$_6$H$_5$O | L | 1 | CN | 90 |
| C$_6$H$_5$CH$_2$O | L | 1 | CN | 260 |
| C$_6$H$_5$CH$_2$O | D | 1 | CN | 110 |
| C$_6$H$_5$CH$_2$O | D | 1 | NO$_2$ | 70 |
| C$_6$H$_5$CH$_2$O | L | 2 | CN | 2 |

Among these compounds, the one possessing the highest sweetening potency (720 times that of sucrose) is derived from L-aspartic acid and has the formula

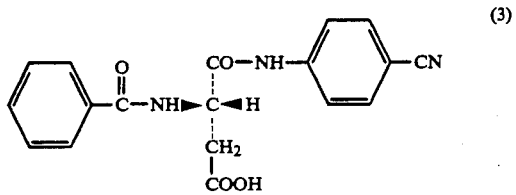

(3)

The only compound described which is derived from L-glutamic acid possesses a very weak sweetening potency of the order of 2 times that of sucrose, which excludes any possibility of industrial application.

The document EP-A-0.338.946 has proposed a novel family of sweetening agents of the general formula

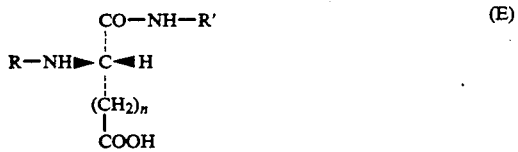

(E)

in which R is a saturated or unsaturated, acyclic, cyclic or mixed hydrocarbon group containing five to thirteen carbon atoms, R' is a 4-cyanophenyl, 2-cyanopyrid-5-yl or 2-cyanopyrimidin-5-yl group and n is equal to 1 or 2. This document is illustrated by 25 Examples (Table 2). One of the preferred compounds in this document possess a sweetening potency of 1000 times that of sucrose and has the following formula:

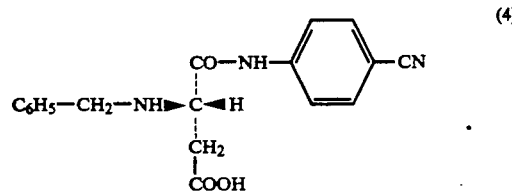

(4)

TABLE 2

| R | n | R | SP |
|---|---|---|---|
| CH$_3$(CH$_2$)$_3$CH$_2$ | 1 | 4-CN—C$_6$H$_4$ | 300 |
| CH$_3$(CH$_2$)$_4$CH$_2$ | 1 | 4-CN—C$_6$H$_4$ | 600 |
| CH$_3$(CH$_2$)$_5$CH$_2$ | 1 | 4-CN—C$_6$H$_4$ | 2000 |
| CH$_3$(CH$_2$)$_6$CH$_2$ | 1 | 4-CN—C$_6$H$_4$ | 400 |
| CH$_3$(CH$_2$)$_2$CHCH$_2$ | 1 | 4-CN—C$_6$H$_4$ | 200 |

TABLE 2-continued

| R | n | R | SP |
|---|---|---|---|
| (CH$_3$)$_2$CHCH$_2$CH$_2$ | 1 | 4-CN—C$_6$H$_4$ | 100 |
| c-C$_6$H$_{11}$CH$_2$ | 1 | 4-CN—C$_6$H$_4$ | 200 |
| c-C$_6$H$_{11}$CH(CH$_3$) | 1 | 4-CN—C$_6$H$_4$ | 200 |
| C$_6$H$_5$CH$_2$ | 1 | 4-CN—C$_6$H$_4$ | 1000 |
| C$_6$H$_5$CH$_2$CH$_2$ | 1 | 4-CN—C$_6$H$_4$ | 300 |
| CH$_3$(CH$_2$)$_3$CH$_2$ | 2 | 4-CN—C$_6$H$_4$ | 1500 |
| CH$_3$(CH$_2$)$_4$CH$_2$ | 2 | 4-CN—C$_6$H$_4$ | 5000 |
| CH$_3$(CH$_2$)$_5$CH$_2$ | 2 | 4-CN—C$_6$H$_4$ | 7000 |
| CH$_3$(CH$_2$)$_6$CH$_2$ | 2 | 4-CN—C$_6$H$_4$ | 2000 |
| (CH$_3$)$_2$CHCH$_2$CH$_2$ | 2 | 4-CN—C$_6$H$_4$ | 800 |
| CH$_3$(CH$_2$)$_2$CH(CH$_3$)CH$_2$ | 2 | 4-CN—C$_6$H$_4$ | 5000 |
| CH$_3$(CH$_2$)$_2$CH=CHCH$_2$ | 2 | 4-CN—C$_6$H$_4$ | 3000 |
| CH$_3$CH=CHCH=CHCH$_2$ | 2 | 4-CN—C$_6$H$_4$ | 2000 |
| C$_6$H$_5$CH$_2$ | 2 | 4-CN—C$_6$H$_4$ | 20 |
| C$_6$H$_5$CH=CHCH$_2$ | 2 | 4-CN—C$_6$H$_4$ | 2000 |
| C$_6$H$_5$CH(CH$_3$)CH$_2$CH$_2$ | 2 | 4-CN—C$_6$H$_4$ | 400 |
| c-C$_6$H$_{11}$CH$_2$CH$_2$CH$_2$ | 2 | 4-CN—C$_6$H$_4$ | 7000 |
| C$_6$H$_5$CH$_2$CH$_2$ | 2 | 4-CN—C$_6$H$_4$ | 300 |
| C$_6$H$_5$CH$_2$CH$_2$CH$_2$ | 2 | 4-CN—C$_6$H$_4$ | 800 |
| CH$_3$(CH$_2$)$_5$CH$_2$ | 2 | 2-CN-pyrid-5-yl | 4000 |

Thus only a limited number of compounds described in the state of the art have an advantageous sweetening potency.

Moreover, all these compounds have the major disadvantage, in terms of their use as sweetening agents, of having a poor stability in aqueous solution (i.e. under the normal conditions of use of synthetic sweetening agents), which considerably limits their application on the industrial scale or even makes it impossible.

Thus the object of the present invention is to provide a novel family of sweetening agents, derived from L-aspartic or L-glutamic acid, which have excellent taste qualities associated with a very high sweetening potency of up to more than 20,000 times that of sucrose.

A further object of the present invention is to provide a novel family of sweetening agents having a high stability compatible with the demands of industrial use.

Thus, according to a first feature, the present invention relates to a novel sweetening agent of the following general formula:

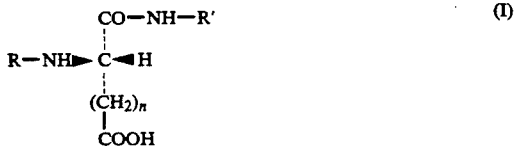

(I)

in which:

R is an acyl group of the formula

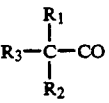

in which:

R$_1$ is a methyl, ethyl, propyl, isopropyl, phenyl, methoxy, ethoxy, trihalogenomethyl, chloro or chloromethyl radical;

R$_2$ is a hydrogen atom or a methyl, ethyl or methoxy radical;

or R$_1$ and R$_2$, taken together with the carbon atom to which they are bonded, form a cycloalkyl group having from 3 to 6 carbon atoms; and R$_3$ is an alkyl radical having from 3 to 11 carbon atoms, an alkenyl radical having from 3 to 7 carbon atoms, a cycloalkyl radical having from 3 to 7 carbon atoms, a cycloalkylalkyl radical of which the cycloalkyl part has from 3 to 6 carbon atoms and the alkyl part has from 1 to 3 carbon atoms, a phenyl radical, a phenylalkyl radical of which the alkyl part has from 1 to 3 carbon atoms, an alkoxy radical having from 3 to 10 carbon atoms, a cycloalkoxy radical having from 3 to 6 carbon atoms, in which the two positions adjacent to carbon 1 attached to the oxygen can each be substituted by 1 or 2 methyl groups, a cycloalkylalkoxy radical of which the cycloalkyl part has from 3 to 6 carbon atoms and the alkoxy part has from 1 to 3 carbon atoms, a phenoxy radical or a phenylalkoxy radical of which the alkoxy part has from 1 to 3 carbon atoms;

n is equal to 1 or 2; and

R' is a group of the formula

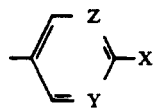

in which Y and Z, which are identical or different, are N or CH, and in which X is selected from the group consisting of CN, $NO_2$, Cl, $CF_3$, $COOCH_3$, $COCH_3$, $COCF_3$, $CONH_2$, $CON(CH_3)_2$, $SO_2CH_3$, $N_3$ and H; and to its physiologically acceptable salts.

Within its framework, the invention comprises all the possible diastereoisomers of the compounds of formula (I) as well as mixtures thereof.

In general formula (I), a trihalogenomethyl group is preferably a trifluoromethyl or trichloromethyl group.

Furthermore, the alkyl, alkenyl or alkoxy groups can have a linear or branched chain.

An alkyl radical having from 3 to 11 carbon atoms is for example a propyl, isopropyl, butyl, pentyl, isopentyl, hexyl, isohexyl, neohexyl, 2,2-ditert-butylethyl or 3,3-ditert-butylpropyl group.

An alkenyl radical having from 3 to 7 carbon atoms is for example a propenyl, butenyl, isopentenyl, isohexenyl or neoheptenyl group.

An alkoxy radical having from 3 to 10 carbon atoms is for example a propoxy, isopropoxy, butoxy, pentoxy, hexyloxy, isohexyloxy, neoheptyloxy, ethylpropylmethoxy, dipropylmethoxy, ditert-butylmethoxy or ditert-butylethoxy group.

A cycloalkoxy radical having from 3 to 6 carbon atoms, in which the two positions adjacent to carbon 1 attached to the oxygen can each be substituted by 1 or 2 methyl groups, is for example a cyclopropyl, cyclobutyl, 2,2,4,4-tetramethylcyclobutyl, cyclopentyl, 2,2,5,5-tetramethylcyclopentyl, cyclohexyl, 2,6-dimethylcyclohexyl or 2,2,6,6-tetramethylcyclohexyl group.

In a preferred embodiment:

$R_1$ is a methyl, ethyl, phenyl, methoxy, ethoxy, trifluoromethyl, chloro or chloromethyl radical;

$R_2$ is a hydrogen atom or a methyl or ethyl radical; or $R_1$ and $R_2$, taken together with the carbon atom to which they are bonded, form a cyclopropyl, cyclobutyl or cyclopentyl group; and $R_3$ is a normal alkyl radical having from 3 to 5 carbon atoms, a branched alkyl radical having from 3 to 7 carbon atoms, an alkenyl radical having from 3 to 7 carbon atoms, a cycloalkyl radical having from 3 to 6 carbon atoms, a cycloalkylmethyl or cycloalkylethyl radical of which the cycloalkyl part has from 3 to 6 carbon atoms, a phenyl radical, a phenylmethyl radical, a phenylethyl or phenylisopropyl radical, an alkoxy radical having from 3 to 6 carbon atoms, a cycloalkoxy radical having from 3 to 6 carbon atoms, a cycloalkylmethoxy radical of which the cycloalkyl part has from 3 to 6 carbon atoms, a phenoxy radical, or a phenylmethoxy or phenylethoxy radical; n and R' being as defined above.

All the sweetening agents defined in this way have a high sweetening potency which is generally at least equal to that of the compounds of the state of the art having the most intense sweetening potencies.

The invention is based on the totally unexpected discovery showing that the presence of a 2-substituted acyl group R in compounds derived from L-aspartic or L-glutamic acid results in a considerable increase in the sweetening potency of such compounds.

Furthermore, it has been observed that the sweetening intensity of the compounds of the invention varies according to the configuration of the acyl group R (when $R_1$, $R_2$ and $R_3$ are different radicals).

For example, when $R_1$ is a methyl group and $R_2$ is a hydrogen atom, it is found, in the case where $R_3$ is a butyl group, that the sweetening potency of the compounds in which the acyl group has an (S) configuration is higher than that of the corresponding compounds in which the acyl group has an (R) configuration. By contrast, when $R_3$ is a phenoxy group, the sweetening potency of the compounds in which the acyl group has an (R) configuration is distinctly higher than that of the corresponding compounds in which the acyl group has an (S) configuration.

It is for this reason that the compounds of formula (I) in which the acyl radical R has the following configuration:

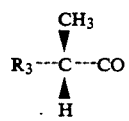

in which $R_3$ is as defined above, form a very advantageous class of compounds according to the invention.

It has also been observed that, among these compounds, those derived from L-glutamic acid have a remarkable stability compatible with the most stringent industrial demands, especially those of the manufacture of soft drinks.

Thus the derivatives of the invention of formula (I) in which n is equal to 2 prove to be particularly advantageous and form a preferred subfamily of compounds of the invention.

It has also been observed that the compounds of formula (I) in which the radical R' is a group of the formula

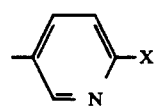

have a particularly high solubility and sweetening intensity because of the presence of the polar nitrogen atom in the ring, the compounds where X is CN being preferred.

It is for this reason that another preferred class of compounds of the invention is represented by the following general formula:

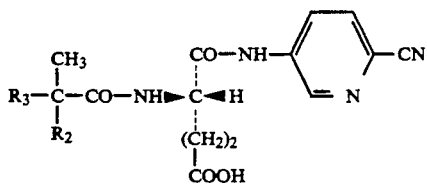

in which $R_2$ is a hydrogen atom or a methyl group and $R_3$ is as defined above.

The sweetening agents of this class have extremely high sweetening potencies, in particular when $R_3$ is a butyl or phenoxy group.

Thus the currently preferred compounds of the invention are as follows:

N-[(S)-2-methylhexanoyl]-alpha-L-glutamyl-5-aminopyridine-2-carbonitrile of the formula

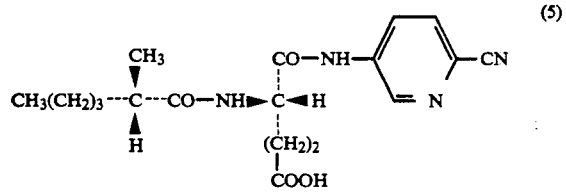
(5)

N-(2,2-dimethylhexanoyl)-alpha-L-glutamyl-5-aminopyridine-2-carbonitrile of the formula

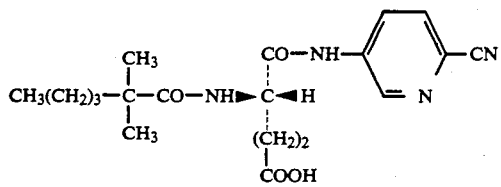

N-[(R)-2-phenoxypropanoyl]-alpha-L-glutamyl-5-aminopyridine-2-carbonitrile of the formula (6)

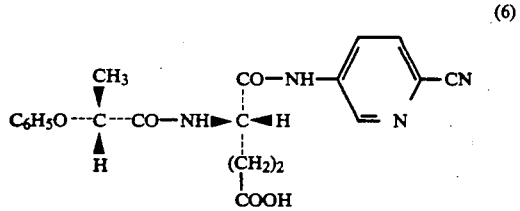

In general, the compounds of the invention are distinguished from those described in the prior art by a distinctly higher sweetening potency, which can be up to more than 100 (one hundred) times greater. For example, some compounds of the invention have sweetening potencies which can be up to more than 20000 times that of sucrose; these are much more intense than the compounds of the prior art, whose sweetening potencies are very distinctly lower on average.

As mentioned previously, compound (1) described in the documents U.S. Pat. Nos. 3,725,453 and 3,775,460 has a sweetening potency of 3000 times that of sucrose, compound (2) cited in the document JP-A-87-132847 has a sweetening potency of only 40 and compounds (3) and (4) described in the documents JP-A-87-252754 and EP-A-0.338.946 have respective sweetening potencies of 720 and 1000 times that of sucrose.

Thus the compounds of the prior art which are the most advantageous from the point of view of their sweetening potency are 8 to 30 times less active than the preferred compounds of the invention.

The stability of the compounds of the invention, in particular those containing the L-glutamyl residue, is very high and can in certain cases be about three hundred times greater than that of the compounds of the prior art. Thus, for example, an accelerated ageing study (prolonged heating at 70° C. of an aqueous solution at pH 3) has been able to show that two compounds characteristic of the invention, namely compounds (5) and (6), have a half-life of about 60 (sixty) days under these accelerated ageing conditions.

By way of comparison, the half-life of a few compounds described in the prior art was evaluated under these same standard conditions. Thus compound (1) described in the documents U.S. Pat. Nos. 3,725,453 and 3,775,460 has a half-life of about 15 hours, compound (2) cited in the document JP-A-87-132847 has a half-life of about 20 hours, compound (3) described in the document JP-A-87-252754 has a half-life of about 8 hours and compound (4) described in the document EP-A-0.338.946 has a half-life of about 2 days. In all cases, the stability of the compounds characteristic of the present invention is much higher, the half-life being 30 to 300 times longer.

Finally, compared with the synthetic sweetening agent most widely used at the present time, namely aspartame (7), whose sweetening potency is 180 times that of sucrose, the preferred compounds of the invention are up to more than 120 times sweeter but also up to 60 times more stable, the half-life of aspartame being only 1 day under these standard conditions.

FIG. 1 shows the stability curves of compounds (1), (2), (3) and (4) of the state of the art, two compounds characteristic of the invention, (5) and (6), and also aspartame (7).

In conclusion, the presence of a 2-substituted acyl radical in the sweetening agents of the invention has the effect of spectacularly increasing the sweetening potency of the compounds derived from L-aspartic or L-glutamic acid, and hence of considerably reducing their cost price. This is coupled with an enhanced stability, in particular for the compounds of the invention which contain L-glutamic acid. To start with, it was not possible to speculate that the introduction of an acyl group substituted in the 2-position or that, for the preferred compounds of the invention, the choice of L-glutamic acid would lead to such a result, since, as is known, any modification, even slight, of the molecular structure of a sweetening agent can cause degradation both of the sweetening activity and of the related properties such as, for example, the stability.

The sweetening agents of the present invention can be added to any edible product to which it is desired to give a sweet taste, provided that they are added in sufficient proportions to attain the desired level of sweetness. The optimal use concentration of the sweetening agent will depend on various factors such as, for example, the sweetening potency of the sweetening agent, the conditions of storage and use of the products, the particular constituents of the products, the taste profile of the edible products and the desired level of sweetness. Any qualified person can easily determine the optimal proportion of sweetening agent which must be employed to obtain an edible product, by performing routine sensory analyses. The sweetening agents of the present invention are generally added to the edible products in proportions ranging from 10 mg to 500 mg of sweetening agent per kilogram or per liter of edible product, depending on the sweetening potency of the compound. The concentrated products will obviously contain larger amounts of sweetening agent and will then be diluted in accordance with the intended final uses.

The sweetening agents of the present invention can be added in the pure form to the products to be sweetened, but because of their high sweetening potency, they are generally mixed with an appropriate carrier or bulking agent.

Advantageously, the appropriate carriers or bulking agents are selected from the group consisting of polydextrose, starch, maltodextrins, cellulose, methyl cellulose, carboxymethyl cellulose and other cellulose derivatives, sodium alginate, pectins, gums, lactose, maltose, glucose, leucine, glycerol, mannitol, sorbitol, sodium bicarbonate, phosphoric, citric, tartaric, fumaric, benzoic, sorbic and propionic acids and their sodium, potassium and calcium salts, and equivalents thereof.

The present sweetening agents can be employed in an edible product by themselves, as the only sweetening agent, or in the form of mixtures of two or more sweetening agents of the present invention. In addition, the present sweetening agents can be used in combination with other sweetening agents such as sugars (sucrose), corn syrup, fructose, sweet dipeptide derivatives (aspartame, alitame), neohesperidin dihydrochalcone, hydrogenated isomaltulose, stevioside, the L sugars, glycyrrhizin, xylitol, sorbitol, mannitol, acesulfame-K, saccharin and its sodium, potassium, ammonium and calcium salts, cyclamic acid and its sodium, potassium and calcium salts, sucralose, monellin, thaumatin and equivalents thereof.

In general, the compounds of the present invention can be prepared by any method which allows the formation of two amide bonds at the alpha-amino and alpha-carboxyl groups of L-aspartic acid (n=1) or L-glutamic acid (n=2).

According to a second feature, the present invention relates to a method of preparing a sweetening agent of formula (I) as defined above, which comprises reacting the following with one another in any order:

on the one hand L-aspartic acid or L-glutamic acid in which the beta- or gamma-carboxyl group, respectively, is protected if appropriate, and on the other hand:
an acid of the formula

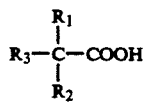

or its acid chloride; and
an amine of the formula H₂N—R';

R₁, R₂, R₃ and R' being as defined above;
so as to create two amide bonds at the alpha-amino and alpha-carboxyl groups of the L-aspartic acid or L-glutamic acid; and if appropriate, converting the resulting product into a physiologically acceptable salt such as a sodium, potassium, ammonium, calcium or magnesium salt.

This method therefore consists in forming an amide bond between an acid of the formula

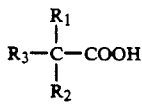

or its acid chloride;
and an amine of the formula

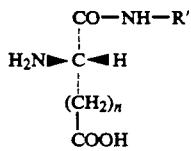

or in forming an amide bond between an acid of the formula

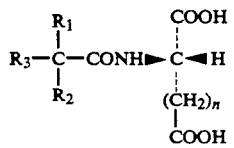

and an amine of the formula

H₂N—R' where $R_1$, $R_2$, $R_3$, n and R' in these formulae are as defined above.

These amide bonds can be produced by numerous methods described in the literature. The order in which each of these bonds is created depends on the choice made by those skilled in the art and on the particular techniques chosen. Thus the amide condensation reaction of a carboxylic acid with an amine can be performed either in the presence of a suitable dehydrating agent such as a carbodiimide, and especially with N,N'-dicyclohexylcarbodiimide, or by activating one of the two reactants, i.e. the amine or the carboxylic acid reactant. In this case, the carboxyl group can be activated by various methods, of which those involving the synthesis of a mixed anhydride, acid chloride, azide or activated ester intermediate (such as, for example, an ester of paranitrophenol or of N-hydroxysuccinimide) may be indicated in particular.

In the particular case of L-aspartic or L-glutamic acid, it may sometimes prove necessary to protect the beta- or gamma-carboxyl group of the side chain before performing the amide condensation reaction. For this purpose, numerous protecting groups for the carboxyl group are described in the literature. Protection in the form of an ester is the most common, more particularly in the form of a tert-butyl ester or a benzyl ester.

In certain cases, protection of this carboxyl group can nevertheless be avoided by forming an internal anhydride between on the one hand the alphacarboxyl group and on the other hand the beta- or gamma-carboxyl group of the L-aspartic or L-glutamic acid according to the equation

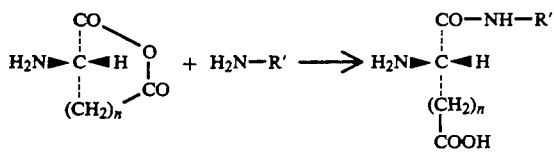

it being possible for the alpha-amino group to be either converted into a salt (for example the hydrochloride, sulfate or benzenesulfonate) or protected by a protecting group. For this purpose, numerous protecting groups for the alpha-amino group are described in the literature, such as, for example, trifluoroacetyl, benzyloxycarbonyl or tert-butoxycarbonyl.

Another technique which makes it possible to avoid protection of this beta- or gamma-carboxyl group consists in performing the amide condensation reaction in aqueous solution, in which case activation is effected by converting the carboxylic acid $(R_1R_2R_3)CCOOH$ into the carboxylic acid chloride. It is then very advantageous to perform the reaction in a basic medium in a water/tetrahydrofuran mixture. The basic agent is preferably $NaHCO_3$, $Na_2CO_3$, NaOH or KOH. Examples which may be mentioned are the following reaction affording one of the precursors of the compounds of the invention:

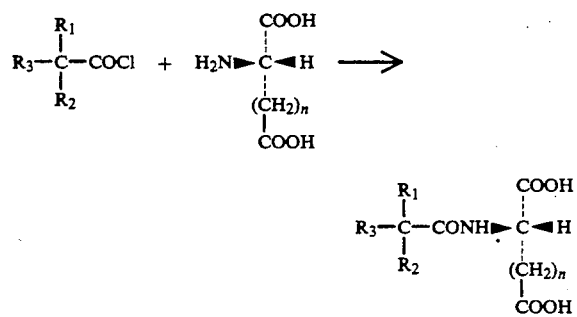

or the following reaction affording the compounds of the invention direct:

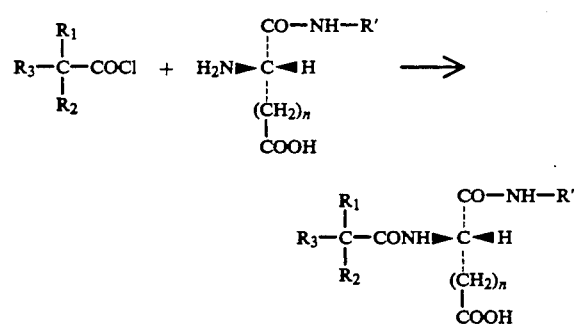

The sweetening agents of the invention can also be converted into salts with physiologically acceptable inorganic or organic bases, which has the effect of considerably improving their rate of dissolution in aqueous solution. Advantageously, these compounds are converted into sodium, potassium, ammonium, calcium or magnesium salts. These salts can be prepared after concentration of an aqueous solution containing the compound of the invention and the chosen basic agent, such as, for example, NaOH or $Na_2CO_3$ in the case of sodium salts.

The purification of the compounds of the invention, in their acid or salt form, is carried out by the standard techniques such as recrystallization or chromatography. Their structure and their purity were checked by the conventional techniques (thin layer chromatography, high performance liquid chromatography (HPLC), infrared spectrometry, nuclear magnetic resonance, elemental analysis).

The sweetening potency of the compounds described in the Examples was evaluated by a team of eight experienced people. This is done by comparing the taste of the compounds, in aqueous solution at variable concentrations, with a 2%, 5% or 10% reference solution of sucrose. The sweetening potency of the test compound compared with sucrose then corresponds to the weight ratio between the compound and sucrose for equal sweetening intensity, i.e. when the sweet tastes of the solution of the test compound and the reference solution of sucrose are considered, by a majority of people, to have the same sweetening intensity.

The stability of the compounds of the prior art and those of the invention is measured using high performance liquid chromatography to determine the amount of product remaining after accelerated ageing in an acid medium (phosphate buffer at pH 3) and at high temperature (70° C.). Under these experimental conditions, measurement of the half-life (time corresponding to 50% degradation) makes it possible to evaluate the potential stability of the compounds tested in this way. A compound of low stability will have a very short half-life of only a few hours, whereas a very stable compound will have a half-life of several tens of days, as is the case, for example, of compounds (5) and (6) of the invention, which have a half-life of about 60 days (FIG. 1).

The way in which the invention can be carried out and the advantages resulting therefrom will become more apparent from the following non-limiting Examples.

EXAMPLES

Among the different possible preparative techniques for obtaining the compounds of the invention, one of the preferred techniques consists in condensing an amino derivative of the formula

with a carboxylic acid which has been activated beforehand in the form of the carboxylic acid chloride. The carboxylic acid is either commercially available or prepared by the methods described in the literature (for example J. Amer. Chem. Soc. 1970, 12, 1397).

The amino derivative can advantageously be prepared by the procedure described in J. Med. Chem. 1973, 16, 163 from L-aspartic or L-glutamic acid and an amine $H_2N-R'$, this latter amine generally being commercially available or prepared by the methods described in the literature (for example: Khim. Geterotsikl. Soedin., 1974, 12, 1645; Khim. Geterotsikl. Soedin., 1982, 11, 1545; Collect. Czech. Chem. Commun., 1975, 40, 1384).

1. Synthesis of N-[(S)-2-methylhexanoyl]-alpha-L-glutamyl-5-aminopyridine-2-carbonitrile:

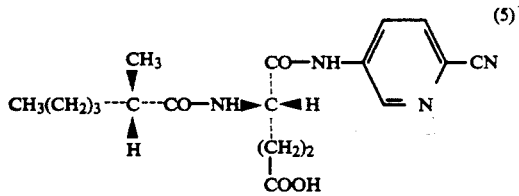

To prepare this compound, a solution of 1.2 g (0.008 mol) of (S)-2-methylhexanoyl chloride (prepared by reacting phosphorus pentachloride with (S)-2-methylhexanoic acid, itself obtained by the method described in J. Biol. Chem. 1926, 70, 211; ibid, 1932, 98, 1 and Chem. Pharm. Bull. 1979, 27, 747) in 30 cm$^3$ of anhydrous tetrahydrofuran is added dropwise to a solution of 1 g (0.004 mol) of alpha-L-glutamyl-5-aminopyridine-2-carbonitrile (prepared according to J. Med. Chem. 1973, 16, 163) and 3.4 g (0.04 mol) of NaHCO$_3$ in 30 cm$^3$ of water. After stirring for 15 minutes at 20° C., the tetrahydrofuran is removed under vacuum and the remaining aqueous solution is acidified to pH 2–3 with a 6N solution of HCl, affording a precipitate of 1 g of N-[(S)-2-methylhexanoyl]-alpha-L-glutamyl-5-aminopyridine-2-carbonitrile (yield 69%, melting point 146° C., in the amorphous state) after filtration and trituration in hexane.

The sweetening potency of this compound corresponds approximately, on a weight basis, to 20,000 (twenty thousand) times that of sucrose by comparison with a 2% solution of sucrose, 15,000 (fifteen thousand) by comparison with a 5% solution of sucrose, and 10,000 (ten thousand) by comparison with a 10% solution of sucrose; in other words, under these conditions, an aqueous solution of 10 mg/l of the compound has an intense sweet taste equivalent to that of a 10% solution of sucrose, which corresponds to the sweetening intensities generally used in food preparations.

The stability of this compound is excellent. An evaluation performed by accelerated ageing under the standard conditions described above (pH 3, 70° C.) indicates that the half-life of the compound under these conditions is about 60 days. By virtue of its high sweetness and its high stability, it is therefore possible to envisage the widest use of this compound in food preparations.

2. Synthesis of N-(2,2-dimethylhexanoyl)-alpha-L-glutamyl-5-aminopyridine-2-carbonitrile:

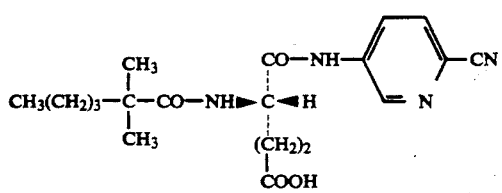

This compound is obtained from 2,2-dimethylhexanoyl chloride (prepared by reacting phosphorus pentachloride with 2,2-dimethylhexanoic acid, obtained by the procedure described in J. Amer. Chem. Soc. 1970, 12, 1397) and alpha-L-glutamyl-5-aminopyridine-2-carbonitrile by the procedure described in the previous Example (yield 60%, melting point 138° C., in the amorphous state).

The sweetening potency of this compound corresponds approximately, on a weight basis, to 22,000 (twenty-two thousand) times that of sucrose by comparison with a 2% solution of sucrose, 15,000 (fifteen thousand) by comparison with a 5% solution of sucrose, and 14,000 (fourteen thousand) by comparison with a 10% solution of sucrose.

The stability of this compound is also excellent, with a half-life evaluated under the standard conditions (pH 3, 70° C.) at about 70 days. As in the previous Example, it is therefore possible to envisage the use of this compound in food preparations.

3. Synthesis of N-[(R)-2-phenoxypropanoyl]-alpha-L-glutamyl-5-aminopyridine-2-carbonitrile:

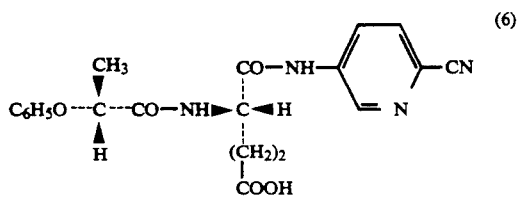

This compound is obtained from (R)-2-phenoxypropanoyl chloride (obtained according to Nouv. J. Chim., 1982, 10, 685; Chem. Ber. 1984, 117, 3457; J. Chem. Soc. C. 1968, p. 1317; Ark. Kemi 1952, 4, 325) and alpha-L-glutamyl-5-aminopyridine-2-carbonitrile by the procedure described in the previous Example (yield 40%, melting point 110° C., in the amorphous state).

The sweetening potency of this compound corresponds approximately, on a weight basis, to 25,000 (twenty five thousand) times that of sucrose by comparison with a 2% solution of sucrose. Its stability, evaluated under the same standard experimental conditions (pH 3, 70° C.), is also very high at about 60 days, which also makes it possible to envisage the very wide use of this compound in food preparations.

4. Synthesis of N-[(S)-2-methylhexanoyl]-alpha-L-glutamyl-4-aminophenylcarbonitrile:

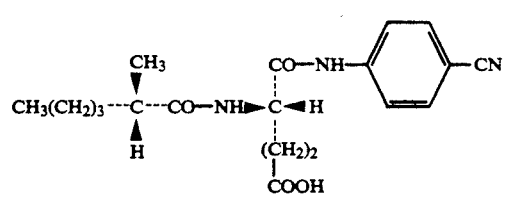

57.6 cm$^3$ (0.408 mol) of trifluoroacetic acid anhydride is added dropwise to 30 g (0.408 mol) of L-glutamic acid. The mixture is heated for 2 h at 70° C. After removal of trifluoroacetic acid under vacuum, the oily residue thus obtained is triturated in an ethyl ether-hexane mixture. The N-trifluoroacetyl-L-glutamic acid anhydride obtained is directly used for the next step.

A mixture of 30 g (0,133 mmol) of the anhydride thus obtained and 15.0 g (0,133 mol) of 4-aminobenzonitrile, in 100 cm$^3$ of tetrahydrofuran, is stirred for 12 h at 40° C. The tetrahydrofuran is removed under vacuum, and then the residue thus obtained is dissolved in 200 cm$^3$ of a 5% solution of No$_2$CO$_3$ and the resulting solution is washed with methylene chloride (3×100 cm$^3$) and then acidified to pH 2–3 with a 6N solution of HCl. The precipitate thus obtained is filtered, washed with some cm³ of water and dried, to give 27 g (yield 60%) of a mixture of alpha- and gamma-L-glutamyl-4-aminophenylcarbonitrile isomers. The alpha isomer is obtained separately after recrystallization in an ethanol-hexane mixture (150-90). 15 g of N-trifluoroacetyl-L-glutamyl-alpha-4-aminophenylcarbonitrile (final yield 33%, melting point 197° C.) is obtained.

A solution of 2,5 g (7,28 mmol) of this compound in 25 cm³ of a 12.5% aqueous solution of ammoniac is stirred for 4 h at 20° C. After concentration under vacuum, the resulting solid is washed with ethyl acetate (2×50 cm³) and then dried. 1,5 g of alpha-L-glutamyl-4-aminophenylcarbonitrile (yield 90%, melting point 160° C.) is obtained.

To prepare N-[(S)-2-methylhexanoyl]-alpha-L-glutamyl-4-aminophenylcarbonitrile, 1,2 g (0,008 mol) of (S)-2-methylhexanoyl chloride (obtained by reaction of phosphorus pentachloride with the corresponding acid), in 30 cm³ of anhydrous tetrahydrofuran, is added dropwise to a solution of 1 g (0,004 mol) of alpha-L-glutamyl-4-aminophenylcarbonitrile prepared according to the procedure described hereinabove and 3,3 g of NaHCO₃ in 30 cm³ of water. After stirring for 15 minutes at 20° C., the tetrahydrofuran is removed under vacuum and the remaining aqueous solution is acidified to pH 2-3 with a 6N solution of HCl, affording a precipitate of 1 g of N-[(S)-2-methylhexanoyl]-alpha-L-glutamyl-4-aminophenylcarbonitrile (yield 69%, melting point 143° C., in the amorphous state) after filtration and trituration.

The sweetening potency of this compound corresponds approximately, on a weight basis, to 9000 (nine thousand) times that of sucrose by comparison with 2% sucrose solution. The stability of this compound is excellent. Its half-life, evaluated under the conditions previously described (pH 3, 70° C.), is above 60 days.

Summary Table 3 below gives, by way of examples, a list of a few compounds obtained by experimental protocols similar to those described above, which those skilled in the art will easily find, together with their relative sweetening potency (SP), evaluated on a weight basis, compared with a 2% aqueous solution of sucrose. When the groups $R_1$, $R_2$ and $R_3$ are different, the configuration of the asymmetric carbon to which they are bonded (carbon marked with an asterisk) is designated according to the conventional rules of stereochemistry using the R/S system: R, S or, when both configurations coexist in the same compound, RS.

STABILITY STUDY

FIG. 1 attached shows a comparative study of the degradation curves of a few compounds of the prior art, aspartame (the most widely used synthetic sweetening agent) and a few compounds of the invention, this study consisting of accelerated ageing of their solution in an acid medium (pH 3) by heating at 70° C.

Curves (1) to (4) show the rapid degradation, under these conditions, of the compounds of formulae (1) to (4) described in the afore-mentioned prior art. The curve of compounds (5) and (6), on the other hand, is characteristic of the high stability of the compounds of the invention, in particular those containing L-glutamic acid. Finally, curve (7) shows the relatively low stability of aspartame, whose half-life under these same study conditions is only about 1 day.

TABLE 3

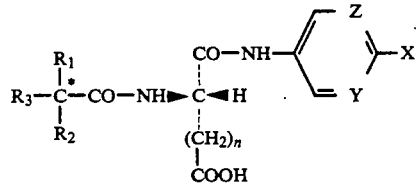

| $R_1$ | $R_2$ | $R_3$ | * | n | Y | Z | X | SP |
|---|---|---|---|---|---|---|---|---|
| CH₃ | H | CH₃(CH₂)₂ | R | 2 | CH | CH | CN | 500 |
| CH₃ | H | CH₃(CH₂)₂ | S | 2 | CH | CH | CN | 2800 |
| CH₃ | H | CH₃(CH₂)₃ | R | 2 | CH | CH | CN | 3000 |
| CH₃ | H | CH₃(CH₂)₃ | S | 2 | CH | CH | CN | 9000 |
| CH₃ | H | (CH₃)₂CH(CH₂)₂ | RS | 2 | CH | CH | CN | 6000 |
| CH₃ | H | CH₃(CH₂)₄ | RS | 2 | CH | CH | CN | 1000 |
| CH₃ | H | C₆H₅ | R | 2 | CH | CH | CN | 1300 |
| CH₃ | H | C₆H₅ | S | 2 | CH | CH | CN | 1500 |
| CH₃ | H | CH₃(CH₂)₃ | R | 2 | N | CH | CN | 2000 |
| CH₃ | H | CH₃(CH₂)₃ | S | 2 | N | CH | CN | 20000 |
| CH₃ | H | C₆H₅ | R | 2 | N | CH | CN | 2500 |
| CH₃ | H | C₆H₅ | S | 2 | N | CH | CN | 4000 |
| CH₃ | H | c-C₆H₁₁ | RS | 2 | CH | CH | CN | 1000 |
| C₂H₅ | H | CH₃(CH₂)₃ | RS | 2 | CH | CH | CN | 5000 |
| C₂H₅ | H | C₆H₅ | RS | 2 | CH | CH | CN | 2700 |
| C₆H₅ | H | C₆H₅ |  | 2 | CH | CH | CN | 250 |
| CH₃O | H | C₆H₅ | RS | 2 | CH | CH | CN | 2300 |
| CH₃O | H | C₆H₅ | R | 2 | N | CH | CN | 11000 |
| CH₃O | H | C₆H₅ | S | 2 | N | CH | CN | 3000 |
| CH₃O | H | CH₃(CH₂)₃ | RS | 2 | N | CH | CN | 2000 |
| CH₃ | H | C₆H₅O | RS | 2 | CH | CH | CN | 4000 |
| CH₃ | H | CH₃(CH₂)₂O | R | 2 | CH | CH | CN | 400 |
| CH₃ | H | CH₃(CH₂)₂O | S | 2 | CH | CH | CN | 200 |
| CH₃ | H | (2,6-diMe)-c-C₆H₉O | RS | 2 | CH | CH | CN | 1000 |
| CH₃ | H | C₆H₅O | RS | 2 | N | CH | CN | 13000 |
| CH₃ | H | C₆H₅O | R | 2 | N | CH | CN | 25000 |
| Cl | H | C₆H₅ | RS | 2 | CH | CH | CN | 2200 |
| CF₃ | CH₃O | C₆H₅ | S | 2 | CH | CH | CN | 600 |
| CH₃ | CH₃ | CH₂=CHCH₂ |  | 2 | CH | CH | CN | 500 |

TABLE 3-continued

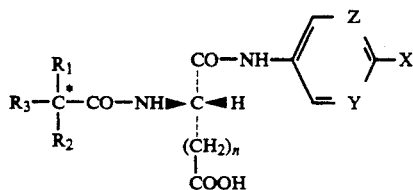

| $R_1$ | $R_2$ | $R_3$ | * | n | Y | Z | X | SP |
|---|---|---|---|---|---|---|---|---|
| $CH_3$ | $CH_3$ | $CH_3(CH_2)_3$ | | 2 | CH | CH | CN | 11000 |
| $CH_3$ | $CH_3$ | $(CH_3)_2CH(CH_2)_2$ | | 2 | CH | CH | CN | 10000 |
| $CH_3$ | $CH_3$ | $(CH_3)_3CH(CH_2)_2$ | | 2 | CH | CH | CN | 4000 |
| $CH_3$ | $CH_3$ | $CH_3(CH_2)_3$ | | 2 | N | CH | CN | 22000 |
| $CH_3$ | $CH_3$ | $CH_3(CH_2)_4$ | | 2 | N | CH | CN | 3000 |
| $CH_2-CH_2$ | | $C_6H_5$ | | 2 | CH | CH | CN | 2500 |
| $CH_2(CH_2)_2CH_2$ | | $C_6H_5$ | | 2 | CH | CH | CN | 2000 |
| $CH_2(CH_2)_2CH_2$ | | $C_6H_5$ | | 2 | N | CH | CN | 3000 |
| $CH_2-CH_2$ | | $C_6H_5$ | | 1 | CH | CH | CN | 1000 |
| $CH_3$ | H | $CH_3(CH_2)_3$ | RS | 1 | CH | CH | CN | 1500 |
| $CH_3$ | H | $C_6H_5O$ | R | 1 | CH | CH | CN | 18000 |
| $CH_3$ | H | $CH_3(CH_2)_3$ | S | 2 | CH | CH | $COCH_3$ | 300 |
| $CH_3$ | H | $CH_3(CH_2)_3$ | S | 2 | CH | CH | $CONH_2$ | 700 |
| $CH_3$ | $CH_3$ | $CH_3(CH_2)_3$ | | 2 | N | CH | Cl | 600 |
| $CH_3$ | H | $CH_3(CH_2)_3$ | S | 2 | N | N | CN | 10000 |

What is claimed is:

1. A sweetening agent of the formula:

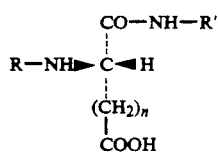

in which:
R is an acyl group of the formula

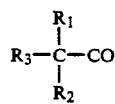

in which:
$R_1$ is a methyl radical;
$R_2$ is a hydrogen atom or a methyl radical;
$R_3$ is an alkyl radical having 4 carbon atoms or a phenoxy radical;
n is equal to 1 or 2; and
R' is a group of the formula:

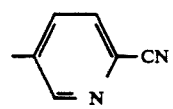

2. A sweetening agent according to claim 1, wherein the acyl group R is a radical of the configuration

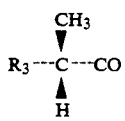

in which $R_3$ is as defined above.

3. A sweetening agent according to claim 1, wherein n is equal to 2.

4. A sweetening agent according to claim 1, which has the formula

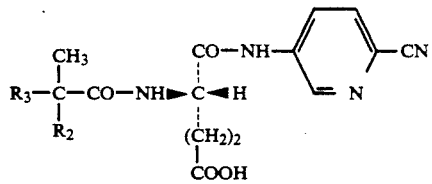

in which $R_2$ and $R_3$ are as defined above.

5. A sweetening agent according to claim 4, wherein $R_3$ is an n-butyl group.

6. A sweetening agent according to claim 4, wherein $R_3$ is a phenoxy group.

7. A sweetening agent according to claim 4, which is N-[(S)-2-methylhexanoyl]-alpha-L-glutamyl-5-aminopyridine-2-carbonitrile.

8. A sweetening agent according to claim 4, which is N-(2,2-dimethylhexanoyl)-alpha-L-glutamyl-5-aminopyridine-2-carbonitrile.

9. A sweetening agent according to claim 4, which is N-[(R)-2-phenoxypropanoyl]-alpha-L-glutamyl-5-aminopyridine-2-carbonitrile.

* * * * *